United States Patent [19]

Snyder

[11] Patent Number: 5,156,135
[45] Date of Patent: Oct. 20, 1992

[54] DIESEL FUEL HEATER

[76] Inventor: David T. Snyder, 4007 Pretense Ct., Fair Oaks, Calif. 95628

[21] Appl. No.: 844,214

[22] Filed: Mar. 2, 1992

[51] Int. Cl.$^5$ ............... F02M 53/00; F02M 31/00
[52] U.S. Cl. ............... 123/557; 236/12.19; 236/12.23; 236/93 A
[58] Field of Search ............... 236/12.19, 12.23, 93 A; 123/557, 552

[56] References Cited

U.S. PATENT DOCUMENTS

| | | | |
|---|---|---|---|
| 3,398,692 | 8/1968 | Suggs | 236/93 A |
| 4,185,771 | 1/1980 | Killias | 236/12.23 |
| 4,190,198 | 2/1980 | Casuga et al. | 236/93 A |
| 4,231,342 | 11/1980 | Johnston | 123/557 |
| 4,483,303 | 11/1984 | Ishikawa et al. | 123/557 |
| 5,036,825 | 8/1991 | Stone | 123/557 |
| 5,042,447 | 8/1991 | Stone | 123/557 |

Primary Examiner—E. Rollins Cross
Assistant Examiner—M. Macy
Attorney, Agent, or Firm—Mark C. Jacobs

[57] ABSTRACT

A heater valve for a diesel fuel system for a vehicle having a main body portion with a fuel inlet and a fuel outlet adapted to be coupled to the vehicle fuel system. A fuel inlet line and a fuel outlet line from the valve are adapted to be coupled to a heat exchanger. A fuel distribution chamber in the valve is in fluid communication with the fuel inlet and the fuel outlet line and a fuel mixing chamber in the valve is in fluid communication with the fuel inlet line and the fuel outlet. A port opens into the mixing chamber and a spring bias valve in the mixing chamber has a restrictor normally restricting the size of the port opening with a valve shaft extending through an opening in a partition wall into the distribution chamber into engagement with a calibrator. A temperature sensor is associated with the valve for sensing the temperature of fuel in the mixing chamber and moving the valve to open both the port and the opening in the partition wall to allow fuel to flow into the mixing chamber from the distribution chamber.

12 Claims, 5 Drawing Sheets

DIESEL FUEL HEATER

FIELD OF THE INVENTION

The invention relates to diesel fuel engines; and, more particularly, to devices that heat diesel fuel for use in diesel engines.

DESCRIPTION OF THE PRIOR ART

The term heater is being used herein to distinguish between a prior art device that preheats diesel fuel to a flowable temp within extremely cold climates, e.g., those climate such that diesel fuel is flowable in a jelly-like condition.

The heater of this invention is intended to elevate the temps of the diesel fuel to about 155-160 degrees Fahrenheit.

It is well known that heating fuel prior to its introduction into the combustion chamber increases the efficiency of diesel engines. There are many obstacles to overcome when designing a diesel fuel heating device. The object of these fuel heaters is to provide the combustion chamber with diesel fuel that is warmed to a predetermined temperature. The heat output of the fuel heater must be adjustable to satisfy the different amounts of fuel needed, depending on whether the vehicle is idling or accelerating. The fuel heater must also work within a wide range of environmental temperatures and pressures. The heat output required from the fuel heater at warm temperatures is much less than the heat output required when the outside temperature is below zero.

The fuel heaters must be inexpensive to manufacture and relative easy to install. Savings from this type of device occur over an extended period of time due to increased fuel savings. Additionally, fuel heaters of this type decrease the amount of harmful emissions created by a diesel engine.

The prior art contains many attempts to overcome the problems faced when designing a diesel fuel heater. One attempt to overcome the many problems unique to diesel fuel heaters is disclosed in U.S. Pat. No. 4,700,047 to Crossett. Crossett discloses the use of an elongated heat exchanger coil which is coiled inside of a coolant containing housing. The use of a coiled heat exchange coil to transfer heat from the coolant to the fuel limits the ability of the fuel heater to heat the fuel in common winter temperatures unless the coolant is preheated or the heat exchange coil is lengthened.

Another attempt to solve these problems is the fuel heater disclosed in U.S. Pat. No. 4,971,018 to Ray. However, this apparatus requires an adjustment collar which, even though sealed, may allow leakage and contamination of the fuel.

In U.S. Pat. No. 4,858,584 to Bridgeman, a diesel fuel heat exchanger is disclosed adapted to heat fuel at a high temperature. However, there is no temperature control.

Thus, there is a need to heat diesel fuel to prevent the same from gelling and plugging filters and making the vehicle in which the fuel is used difficult to start.

SUMMARY OF THE INVENTION

It is an object of this invention to provide a diesel fuel heater adapted to heat to a temperature of about 155 degrees to 160 degrees Fahrenheit.

It is still further an object of this invention to carry out the foregoing object using a dual mixing chamber in the valve to provide a backup control.

These and other objects are preferably accomplished by providing a heater valve having a main body portion with a fuel inlet and a fuel outlet adapted to be coupled to the vehicle fuel system. A fuel inlet line and a fuel outlet line from the valve are adapted to be coupled to a heat exchanger. A fuel distribution chamber in the valve is in fluid communication with the fuel inlet and the fuel outlet line and a fuel mixing chamber in the valve is in fluid communication with the fuel inlet line and the fuel outlet. A port opens into the mixing chamber and a spring biased valve in the mixing chamber has a restrictor normally restricting the size of the port opening with a valve shaft extending through an opening in a partition wall into the distribution chamber into engagement with a calibrator. A temperature sensor is associated with the valve for sensing the temperature of fuel in the mixing chamber and moving the valve to open both the port and the opening in the partition wall to allow fuel to flow into the mixing chamber from the distribution chamber.

DESCRIPTION OF THE PREFERRED EMBODIMENT

Figure 1:
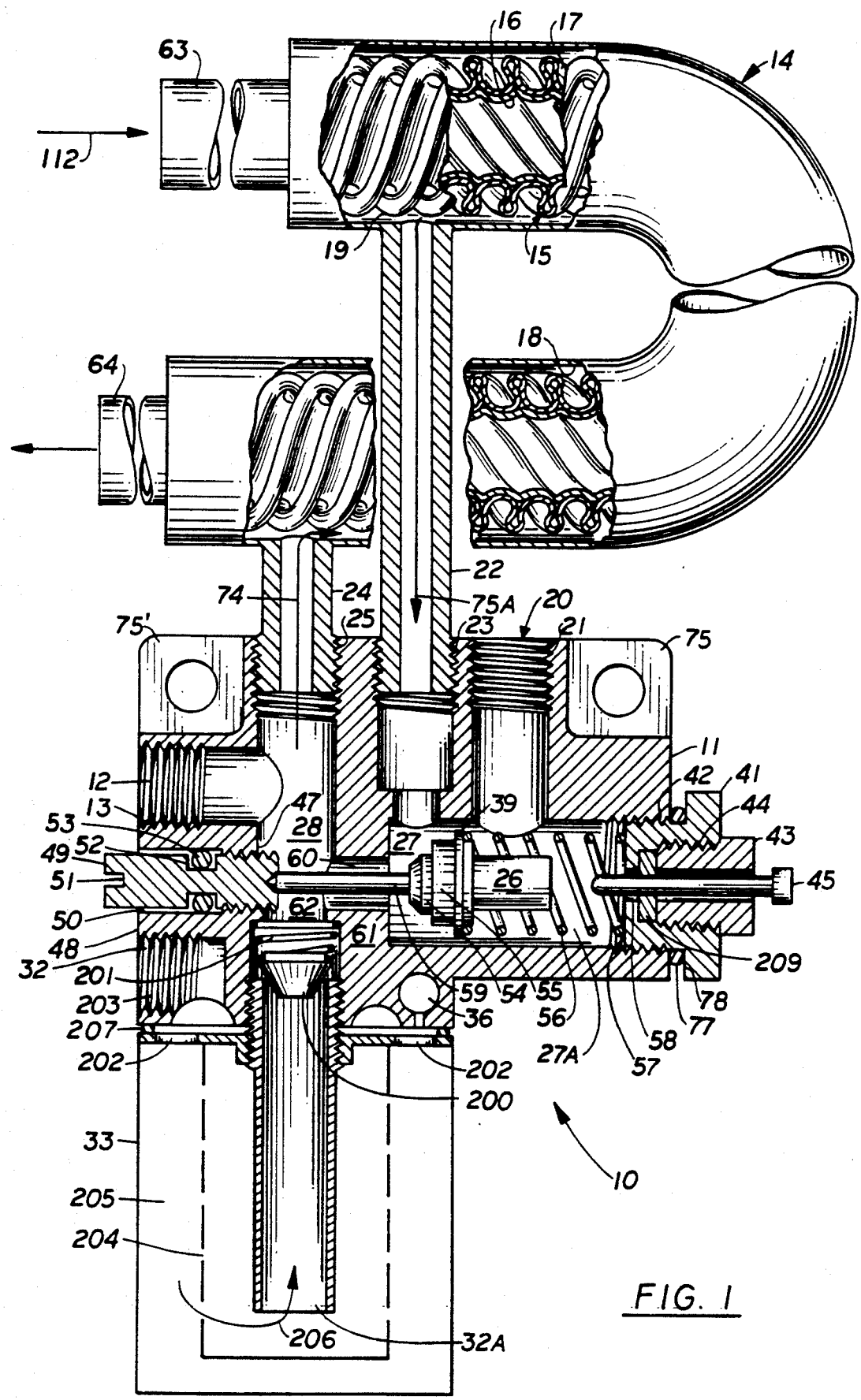
FIG. 1 is a vertical sectional view of a single element heater valve in accordance with the invention.

Referring now to FIG. 1 of the drawing, a single element diesel fuel heater valve 10 is shown coupled to a U-shaped heat exchanger 14. Valve 10 has a main body portion which portion 11 has a fuel inlet 12, which is internally threaded at threads 13 for coupling to a fuel hose (not shown in FIG. 1) for introducing cold fuel into heater valve 10 from a source from within the vehicle in which the heater valve 10 is installed.

A double walled heat exchanger element 15 is mounted internally of heat exchanger 14, said element having an inner copper tube 16 spiralled on its interior and bonded to an outer spiralled sleeve 17 of carbon steel. Suitable tubing which may be used as element 15 is manufactured and sold by Turbotec Products, Inc. of Windsor, Conn. under the name Turbotec Tubing. See also U.S. Pat. No. 3,730,229 assigned to Turbotec. Heat exchanger 14 has an interior wall 18 and a vent space 19, which is provided between sleeve 17 and inner wall 18 (per FIG. 1) as is shown in the patent cited.

A hot fuel outlet 20 is provided on main body portion 11, having threads 21 for the coupling of said outlet 20 to a fuel hose (not shown in FIG. 1). A fuel inlet 22 is provided which may be a threaded insert threaded to a threaded inlet 23 of main body portion 11. Inlet 22 is used to return fuel flowing about element 15 back into valve 10 in the direction of arrow 75A.

A second fuel outlet 24 is fluidly coupled to the interior of heat exchanger 14 so that fuel flows through heat exchanger 14 about the exterior of element 15 in the direction of arrow 74. This fuel outlet 24 may also be in the form of a threaded insert threaded to a threaded inlet 25 of said main body portion 11.

Chamber 28 is a distribution chamber. Cold fuel from the fuel tank of the vehicle (not shown in FIG. 1) enters valve 10 through port or inlet 12's threaded opening 13, into distribution chamber 28 and flows out port or outlet 24 into the interior of heat exchanger 14 about tube 15. The fuel reenters valve 10 as hot fuel at port or fuel inlet 22.

Figure 2:
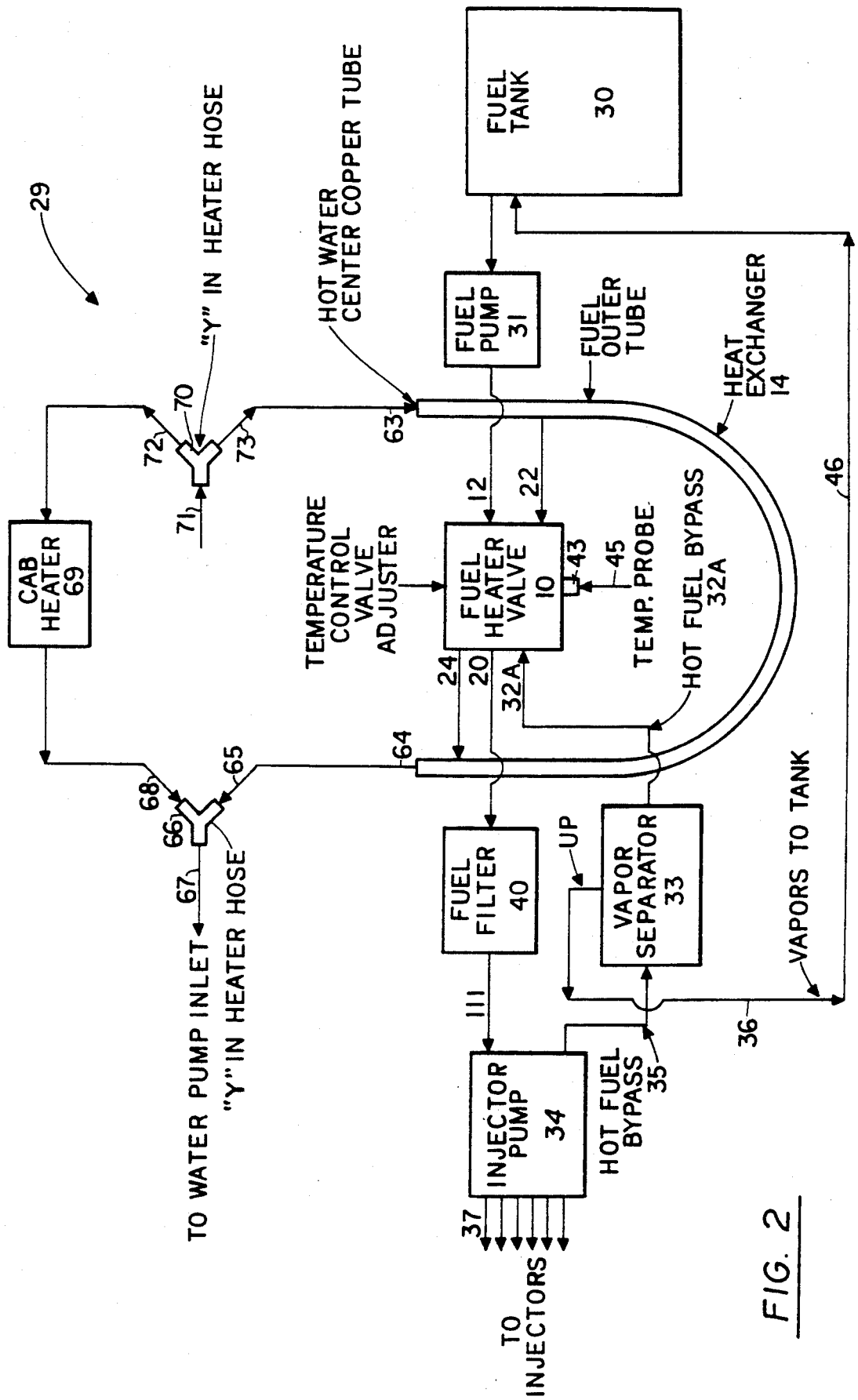
FIG. 2 is a schematic illustration of a diesel fuel system incorporating the heater valve of my invention.

A schematic illustration of a diesel fuel system 29 is shown in FIG. 2. As is seen, the fuel tank 30 of the vehicle is schematically illustrated. A fuel pump 31 may be disposed between inlet 12 and tank 30. As seen in FIG. 1, a port 60 opens into a mixing chamber 27 within which a temperature sensor 26 is mounted.

As seen in FIG. 2, hot fuel bypass line 35 leads to a vapor separator 33 which is thus coupled to both injector pump 34, via bypass line 35, and to fuel tank 30 via line 36 for returning vapors to tank 30. A plurality of injector lines, all designated 37 lead from pump 34 to injectors (not shown) and for returning fuel back into tank 30 as is well known in the art.

Hot fuel, formerly bypassed from the injectors via line 35, and returned to tank 30, is now routed into threaded port 32, vapor separator 33, and through port 32A past check valve 200, biased by spring 201, and into valve 10 where the hot fuel is mixed with additional cold fuel and exits port 24 passing through heat exchanger 14 then enters valve 10 via valve inlet 22. New cold fuel from port or inlet 12 is blended into the hot fuel to a predetermined temperature of about 155 to 160 degrees Fahrenheit. Apertures 202 in separator 33 fluidly communicate the interior thereof with line 36 and port 203 communicating with line 35, apertures 204 in the interior of passageway 205 fluidly communicate the passageway 205 and port 32A as seen by arrow 206. O-ring 207 is provided between separator 33 and valve 10.

As hot fuel flows from heat exchanger 14 through port or inlet 22 into the primary mixing chamber 27, the hot fuel mixes with hot returned fuel from bypass line 35 entering the valve through port 32A. The combined fuel passes around opening restrictor disk 39, per FIG. 1, which disk 39 is coupled to sensor 26, and then over sensor 26 (which may be a conventional wax element temperature sensor) and out port or outlet 20 to and through fuel filter 40 (FIG. 2) back into injector pump 34 via line 111.

A threaded ported plug 41 (FIG. 1) may be threaded into a threaded inlet 42 opening into the interior of a sensing chamber 27A. A second ported plug 43 is threadedly engaged into threaded inlet 44 of plug 41. A probe plug 45 is mounted in ported plug 43 and extends into the interior thereof. If desired, the probe plug 45 may be removed and a thermometer probe inserted therein when the temperature of the fuel in valve 10 is being calibrated. Port or plug 43 may be used for a conventional temperature sending unit to a dashboard mounted gauge, if desired.

Vapor line 36 (see FIGS. 1 and 2) from vapor separator 33, if used, is fluidly connected to the old or original fuel bypass line 46 (FIG. 2) and returns to tank 30.

Valve body portion 11 (FIG. 1) is closed off at the end opposite plug 43 by an end wall 47 (which end wall includes portions of port 12 and threaded outlet 25) and which wall has a ported extension portion 48 having a calibration screw 49 threaded into a threaded port 50 through portion 48. Screw 49 has a slotted head 51 and an annular groove 52 wherein lies a resilient O-ring 53. Screw 49 abuts against a piston shaft 59, which extends through opening 60 in inner partition wall 61, to the main body 54 of valve 55 having disk 39 and temperature sensor 26 coupled thereto.

A coil spring 56 surrounds sensor 26 between disk 39 on one end and the wall 57 of sensing chamber 27A on the other end. This wall 57 surrounds opening 58 which extends through plug 41. Spring 56 normally biases valve 55 to the left in FIG. 1. Screw 49 can be rotated, via slotted head 51, to calibrate valve 55 to provide for either early or later opening thereof by extension of piston shaft 59.

When preset temperature sensor 26 senses a higher temperature than desired, it causes piston shaft 59 to expand against calibration screw 49 (screw 49 may have a cavity or depression 62 in which piston shaft 59 sits) and moves main body 54 away from valve opening 60 thereby allowing cooler fuel to enter mixture chamber 27. When cooler fuel flows around valve 55, the pressure in distribution chamber 28 drops and fuel flow out of port 24 is reduced and less hot fuel enters mixing chamber 27. [Hot fuel also flows into mixing chamber 27 from the engine bypass line 32A into chamber 28.] The temperature sensor 26 eventually stabilizes at the desired temperature with the aid of the return spring 56.

As seen in FIG. 1, engine coolant, designated 112, enters heat exchanger 14 through inlet tube 63 and into the interior of element 15 (i.e., inside of inner tube 16). This is counter to the flow of fuel moving through heat exchanger 14 about the periphery of the outer spiral of sleeve 17 between sleeve 17 and the inner wall 18 as discussed above. Engine coolant exits out of outlet tube 64, also in fluid communication with the interior of inner tube 16, and is returned to the engine (see FIG. 2). Thus the two fluids flow oppositely.

As seen in FIG. 2, outlet tube 64—also seen at the top of FIG. 1—is in fluid communication with one inlet 65 of Y-connection 66. An outlet 67, from Y-connection 66, leads to the inlet of the vehicle's water pump. An inlet 68 leads into Y-connection 66 from the vehicle heater 69 of the vehicle. A second Y-connection 70 has an inlet 71 leading from the outlet of the water pump of the vehicle (unnumbered). The Y-connection has one outlet 72 leading to the same heater 69's inlet end. Y-connection 70 also has another outlet 73 leading to inlet 63. See also FIG. 1.

The foregoing describes a diesel fuel heater system incorporating the single element valve of the invention. Suitable apertured brackets 75, 75' may be provided for securing or bolting of valve 10 to the vehicle. A resilient O-ring 77 of suitable material shown in FIG. 1, may be provided in groove 78 in plug 41.

Although a single element valve 10 is disclosed in FIG. 1, a dual element safety valve 76 (FIG. 3) may be provided comprised of upper and lower elements 79, 80. Valve 76 is substantially identical to valve 10 other than having dual elements 79, 80 and accordingly like numerals refer to like parts of the valve 10 of FIG. 1. Also, primed numerals refer to like numerals of the valve 10 as utilized in FIG. 1. Instead of an apertured plug 41, the lower element 80 in valve 76 of FIG. 3 includes unported plug 41" threaded into opening 42". Upper element 79 may be separated from lower element 80 by a wall 81 between the two chambers. Suitable O-rings 84, 85 are provided in respective grooves 86, 87.

Figure 3:
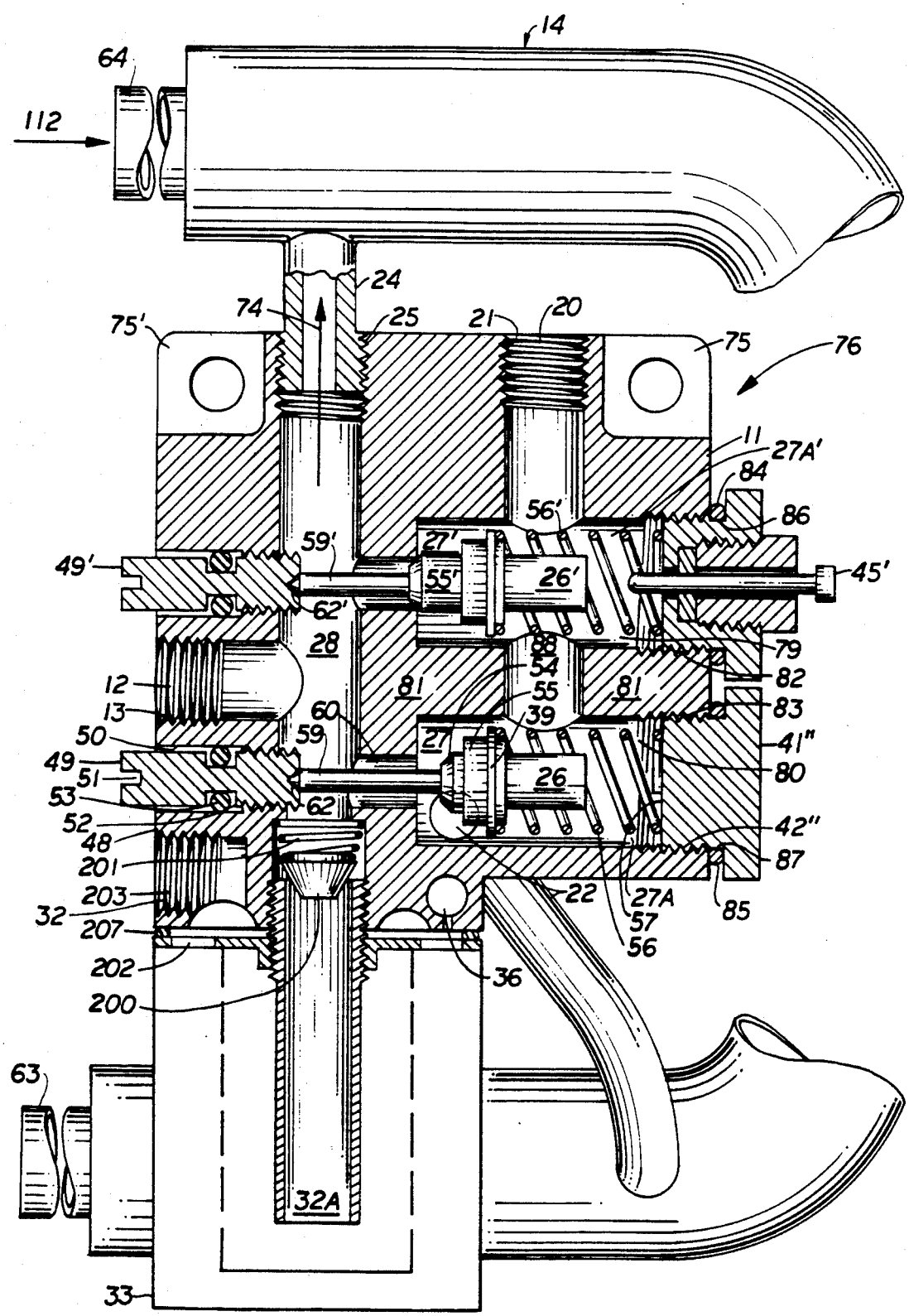
FIG. 3 is a view similar to FIG. 1 showing a dual element heater valve.

The only appreciable change between the single element valve of FIG. 1 and the dual element valve of FIG. 3 is that a port 88 is provided through wall 81 between the upper and lower elements 79, 80. The operation of valve 76 is otherwise identical to the foregoing operation of valve 10 except that, as hot fuel flows from heat exchanger 14 through port 22 into the primary mixing chamber 27 (the chamber 27 in the lower element 80 being the primary mixing chamber), it mixes with hot returned fuel from the bypass inlet 32A, (in the same manner as in FIG. 2) passes around opening restrictor disk 39, and over the wax element temperature sensor 26 and out port 88 into the secondary backup chamber 27A' (the chamber in the upper element 79) and over and around safety wax element temperature sensor 26', then out port 20 into the fuel filter 40 (FIG. 2) then to the engine injector pump 34.

If the temperature of the fuel exiting through port 88 is greater than has been calibrated for with screw 49, indicating a malfunction, calibrating screw 49' can be set a few degrees hotter than the temperature of the primary temperature sensor 26. Thus when backup temperature sensor 26' gets to the calibrated safety temperature, the wax element therein expands the shaft 59' of piston 55' against calibration screw 49' and opens valve or piston 55' allowing cold fuel to enter secondary chamber 27' to blend with overheated fuel in chamber 27A' thereby causing safety temperature sensor 26' to stabilize with the aid of return spring 56' at the safety fuel temperature, thus acting as a redundant temperature sensor before hot fuel exits out port 20 to filter 40. Filter 40 and the connections thereto are seen best in FIG. 2.

The operation of valve 76 in the drawing of FIG. 3 is identical to valve 10.

Calibration may be achieved by using a temperature sending unit for a dash mounted gauge or a thermometer probe inserted into valve 10 or valve 76 during calibration. Either valve may be provided with a removable probe plug for such a gauge or probe.

The foregoing system (either the single element valve 10 of FIG. 1 or the double element valve 76 of FIG. 3) results in improved fuel mileage of about 7 to 18 percent because of better combustion. Exhaust emissions improvements have been found to be as follows:

Hydrocarbons 67% less; CO 99% less; NOX 19% less; and particulates 66% less.

Since fuel temperature is stabilized at the specified maximum and this temperature does not exceed the manufacturer's recommended maximum temperatures the vehicle warranty is not voided or otherwise effected.

Because the system disclosed herein does not overheat the fuel, there is no engine damage. In the double element valve of FIG. 3, a fail safe double element thermostat is shown. The dual wall/copper carbon steel element 15 of heat exchanger 14 does not allow water to fuel or fuel to water contamination which is common to other systems. Heat exchanger 14 is very efficient where the fuel travels in spiral flutes around the center of water tube 16. It is up to 350% more efficient than conventional tube heat exchangers with greater internal burst pressures.

Any defect in the heat exchanger tubes will leak to atmosphere and reveal a defect and not contaminate the other liquid.

Since the operating temperature of this apparatus is adjustable, one model fits many applications. The system of this invention allows for extremely cold weather operation by prewarming the fuel filter with warm bypass fuel immediately after starting the engine, and it eliminates waxing of the fuel. No other prewarmer is required. The vapor removal bypass returns vapors back to the tank of the vehicle. By having the bypassed fuel rerouted back into the valve 10 or 76,—depending upon embodiment—one doesn't have to heat as much fuel, only the amount that is consumed. Therefore a smaller less expensive heat exchanger can be used. The system disclosed herein greatly eliminates diesel knock and runs quieter with dramatically less vibration. Warm up time is reduced by half and oil change intervals are lengthened by as much as 30%.

The system herein is reliable, rugged and capable of heavy duty use. Visual temperature monitoring using a gauge or an alarm light can be used. A port is provided for inserting a highly accurate thermometer for calibration.

In conclusion, the use of valves 10, 76 results in about a 7 to 18% increase in fuel economy. More of the fuel is burned, since it is thinner, and thus fuel is burned rather than spewed out as a pollutant. A uniform temperature is obtained consistently at all times. The foregoing is accomplished well below the vehicle manufacturer's recommended maximum operating temperatures. The fuel is heated to a temperature of about 155-160 degrees Fahrenheit.

Figure 4:
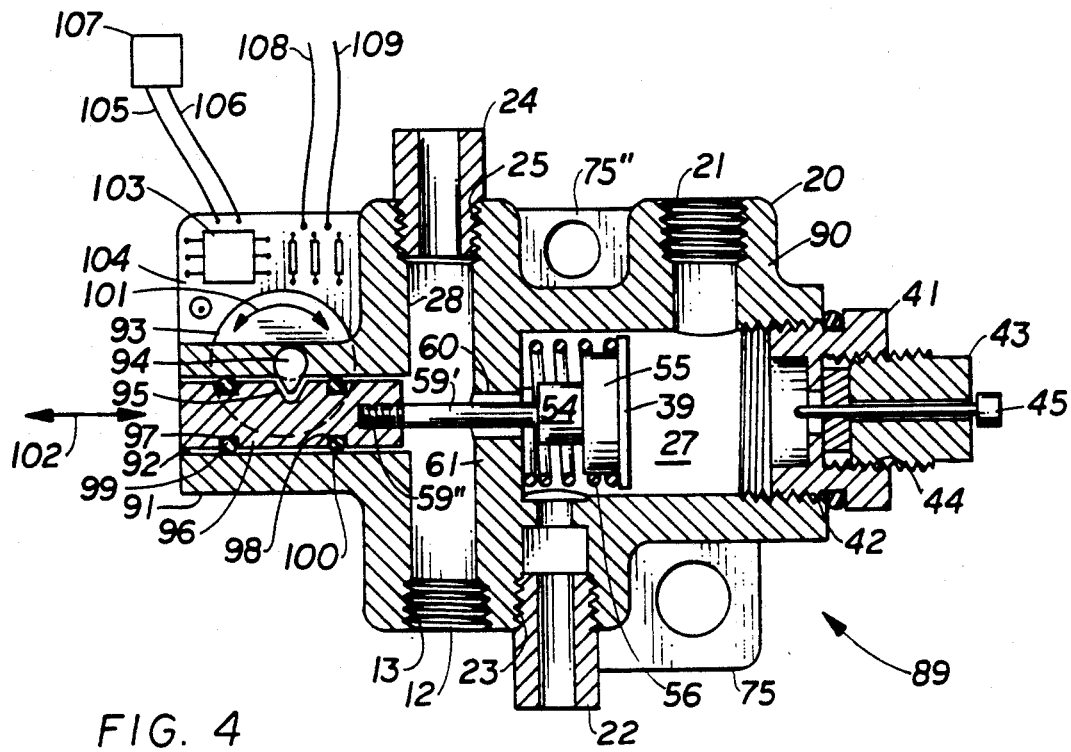
FIG. 4 is a vertical sectional view of a modification of a single element heater valve in accordance with the invention.

The reader's attention is called to the fact that instead of the temperature sensors 26, 26', electronic means may be used for sensing the temperature. Thus, as shown in FIG. 4, wherein like numerals refer to like parts of the valve 10 of FIG. 1, a valve 89 is shown having a main body portion 90. Coil spring 56 is disposed between disk 39 and wall 61. Bracket 75" differs slightly from bracket 75' of FIG. 1 in configuration but serves the same purpose.

Extension portion 91 is unthreaded in port 92 and a servo-motor 93 is provided fixed to axle 94 mounted to flange 104 attached to housing portion 90. Axle 94 is generally triangularly shaped in cross-section and fits into a like configured V-shaped groove 95 in piston 96. A pair of spaced grooves 97, 98 are provided in piston 96, which grooves are for receiving resilient O-rings 99, 100, respectively, therein. The piston 96, reciprocates back and forth within port 92.

As motor 93 rotates as indicated by arrow 101, piston 96 moves back and forth as indicated by arrow 102.

A conventional electronic circuit board 103 is also mounted to flange 104 of housing portion 90 having leads 105, 106 electronically coupled to a thermocouple 107. Board 103 is any suitable state of the art electronic means which, along with the thermocouple 107, operates servo-motor 93. Suitable leads 108, 109 couple board 103 to a suitable source of electricity.

The hydraulic functions of valve 89 are identical to valve 10. Instead of sensor 26, electronic means are provided. When servo-motor 93 turns, it actuates shaft or axle 94 back and forth. Shaft 59' is fixed via threaded end 59" to piston 96 so that it pulls valve 54 coupled thereto proportionately to the sensing of thermocouple 107. Spring 56 is now forcing valve 55 to its open position. When valve 55 is activated, it closes and spring 56 is compressed until it gets warm, then it opens to the proper opening based on input from thermocouple 107. If there is a power failure or the like in the vehicle's electronic system, the spring 56 causes the system to fail in the valve open position such that a high predetermined temperature which could cause damage is not exceeded.

Thermocouple 107 may be installed right at the inlet of the vehicle's fuel injector pump.

Figure 5:
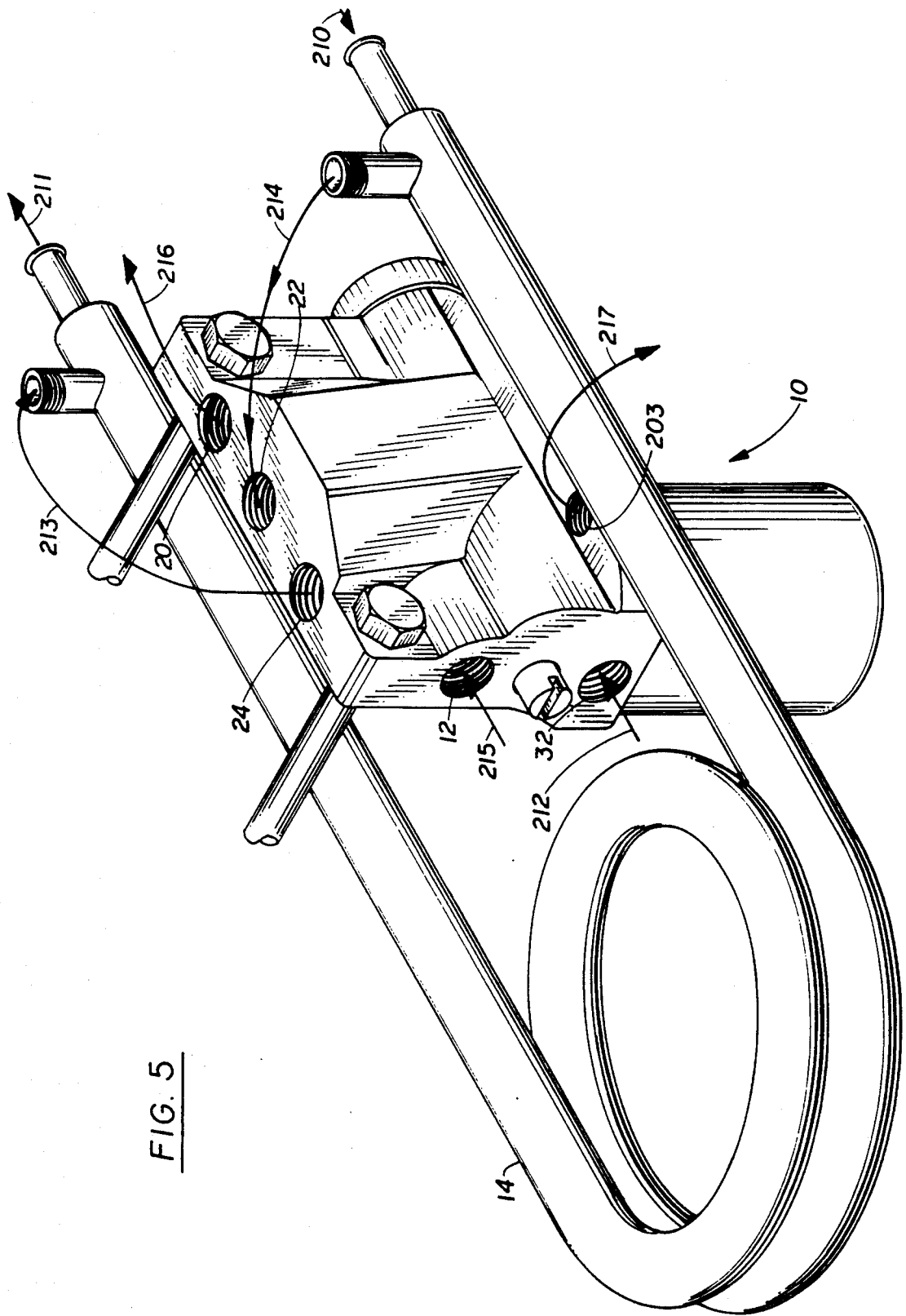
FIG. 5 is a schematic illustration of the valve of FIG. 1.

Although any suitable materials and dimensions may be used, for best results, it has been found that the net area of the orifice 60 surrounding piston shaft 59 may be at a 1 to 1 ratio to the inner area of the inlet port 22. FIG. 5 is a schematic illustration of the valve 10 of FIG. 1 shown connected to heat exchanger 14. As seen, hot water enters heat exchanger 14 via arrow 210 and cooler water exits heat exchanger 14 via arrow 211. Hot fuel bypassed from the engine enters port 32, as indicated by arrow 212. It exits out of port 24 via arrow 213 and into heat exchanger 14. It enters from heat exchanger 14 back into inlet 22 via arrow 214. New cold fuel enters port 12 via arrow 215 and the combined fuel exits via port 20 as indicated by arrow 216, to the filter and vehicle engine. Vapors exit out of port 203, as indicated by arrow 217, back to the vehicle tank.

Figure 6:
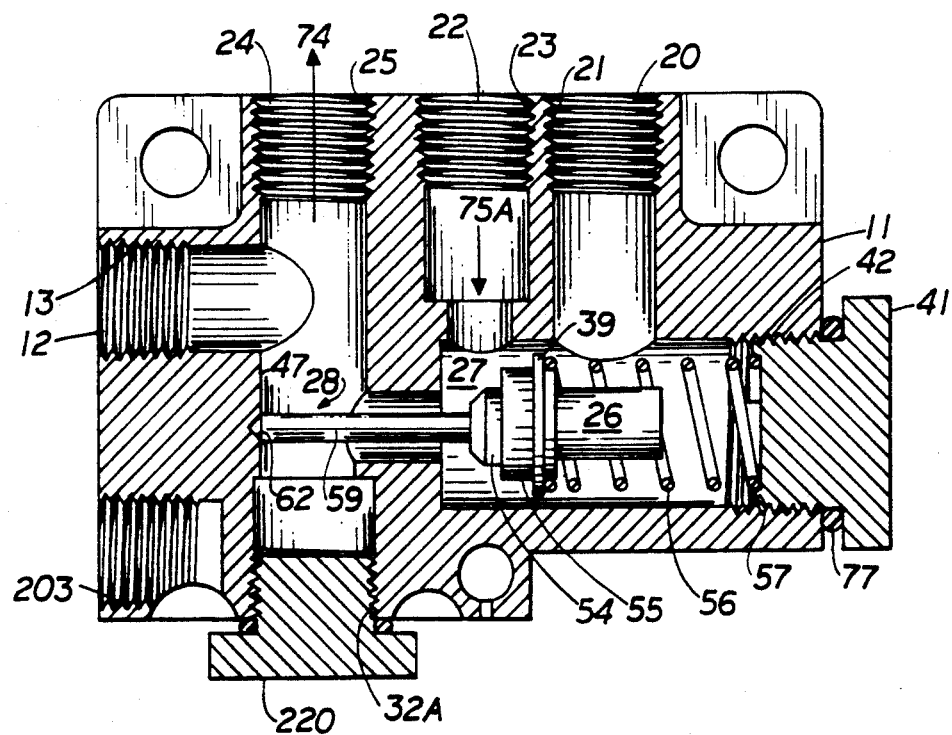
FIG. 6 is a view similar to FIG. 1 of another modification of the invention.

As seen in FIG. 6, wherein like numerals refer to like elements of the valve of FIG. 1 (the heat exchanger being omitted for convenience of illustration), vapor separator 33 has been eliminated and a plug 220 has been threaded into inlet 32A. That is, vapor separator 33 is optional in valve 10 and may be eliminated. Valve 200 and spring 201 can thus be eliminated. In this way, the apparatus of the invention may be used on backing systems and home heating where a vapor separator is not necessary. Obviously, in the schematic of FIG. 2, the vapor separator is merely eliminated.

It can be seen that there is described a system where an optimum heating temperature of about 160 degrees Fahrenheit is achieved in a safe, economical and consistent manner.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A heater valve for use in a fuel system comprising:
a main body portion having a fuel inlet at one end, a fuel outlet at the other end, said main body portion further including both a fuel inlet line and a fuel outlet line, said fuel outlet line and said fuel inlet being in fluid communication with a distribution chamber in said main body portion;
a mixing chamber having an inner wall disposed in said main body portion in fluid communication with both said fuel inlet line and said fuel outlet;
temperature sensing means associated with said mixing chamber for sensing the temperature of fuel flowing therethrough;
a port opening into said mixing chamber;
opening restrictor means coupled to said temperature sensing means associated with said port for restricting the degree of opening thereof, said mixing chamber being separated from said distribution chamber by an inner partition wall in said main body portion;
a spring biased valve coupled to said restrictor means mounted in said mixing chamber having a valve shaft extending though an opening in said partition wall, a spring surrounding said valve between said valve and the inner wall of said mixing chamber; and
calibration means extending into a hole in said main body portion and into engagement with said valve shaft, said valve shaft being normally biased into engagement with said calibration means with said valve closing off the opening through said partition wall.

2. In the valve of claim 1 wherein said calibration means includes a screw threaded into said hole in said main body portion, said calibration screw having a seat therein in which said valve shaft normally sits.

3. In the valve of claim 2 wherein said calibration screw has a slotted head accessible from the exterior of said main body portion.

4. In the valve of claim 1 including a normally closed port in said main body portion in fluid communication with the interior of said mixing chamber, and a removable plug mounted in said normally closed port, whereby when said plug is removed, a thermometer can be inserted through said normally closed port into the interior of said mixing chamber.

5. In the valve of claim 1 wherein said temperature sensing means includes a wax element temperature sensor coupled to said valve.

6. In the valve of claim 1 wherein said temperature sensing means includes a servo-motor mounted in said main housing portion electronically coupled to both said valve and a thermocouple.

7. In the valve of claim 1 wherein said calibration means includes a piston mounted in said hole in said main body portion engaging said valve shaft, said servo-motor being fixed to an axle engaging said piston whereby rotation of said servo-motor moves said piston laterally within said last-mentioned hole.

8. In the valve of claim 7 wherein said axle is generally V-shaped in cross-section, having its apex disposed in and mating with a V-shaped notch in said piston.

9. In the valve of claim 8 wherein said piston has a piston seat into which the tip of said valve shaft normally sits.

10. In the valve of claim 1 wherein said valve includes a second mixing chamber in fluid communication with said first mentioned mixing chamber, a second spring biased valve mounted in said second mixing chamber having a second sensing means associated therewith, said second spring biased valve having a valve shaft extending through said partition wall and into said distribution chamber with said shaft being adapted to abut against a second calibration means extending through a second hole in said main body portion and into engagement with said second valve shaft, said fuel outlet being in fluid communication with said second mixing chamber and said second spring biased valve being adapted to close off said second opening through said partition wall.

11. In the valve of claim 10 including a normally closed port in said main body portion in fluid communication with the interior of said second mixing chamber, and a removable plug mounted in said normally closed port whereby, when said plug is removed, a thermometer can be inserted through said normally closed port into the interior of said second mixing chamber to calibrate the temperature of fuel therein.

12. In the valve of claim 11 wherein the ratio of the net area of said opening in said partition wall to the inner area of said fuel inlet line is 1:1.

* * * * *